United States Patent [19]

Tsujimoto

[11] Patent Number: 5,511,229
[45] Date of Patent: Apr. 23, 1996

[54] DATA PROCESSING SYSTEM HAVING A SWITCHING NETWORK CONNECTING MULTIPLE PERIPHERAL DEVICES USING DATA PATHS CAPABLE OF DIFFERENT DATA BUS WIDTHS

[75] Inventor: Taizou Tsujimoto, Fujiidera, Japan

[73] Assignee: Matsushita Electric Industrial Co., Ltd., Osaka, Japan

[21] Appl. No.: 944,442

[22] Filed: Sep. 14, 1992

[30] Foreign Application Priority Data

Sep. 13, 1991 [JP] Japan ...................... 3-234580

[51] Int. Cl.⁶ .................................. G06F 13/00
[52] U.S. Cl. .............. 395/851; 364/238.2; 364/239.3; 364/240.3; 364/DIG. 1
[58] Field of Search ............................ 395/275, 200, 395/325, 800, 851

[56] References Cited

U.S. PATENT DOCUMENTS

| | | | |
|---|---|---|---|
| 3,984,819 | 10/1976 | Anderson | 395/325 |
| 4,447,878 | 5/1984 | Kinnie et al. | 364/200 |
| 4,716,527 | 12/1987 | Graciotti | 364/200 |
| 4,845,611 | 7/1989 | Turlakov et al. | 364/200 |
| 4,965,723 | 10/1990 | Kirk et al. | 364/200 |
| 5,220,651 | 6/1993 | Larson | 395/250 |

FOREIGN PATENT DOCUMENTS 61-156358  7/1986  Japan.
2-289016  11/1990  Japan.

*Primary Examiner*—Thomas C. Lee
*Assistant Examiner*—Sang Hui Kim
*Attorney, Agent, or Firm*—Wenderoth, Lind & Ponack

[57] ABSTRACT

A data processing apparatus includes a first (k×m)-bit data bus wherein k is a byte count and m is a bit length of one byte, a plurality of m-bit I/O peripheral devices at least one which is connected to two or more of m-bit data buses belonging to a first group consisting of first to k-th m-bit data buses obtained by dividing the first (k×m)-bit data bus into the first to k-th m-bit data buses; a second (k×m)-bit data bus, a (k×m)-bit I/O central processing unit connected to the second (k×m)-bit data bus which is divided into (k+1)-th m-bit data buses consisting of a second group of m-bit data buses; a data path switching circuit connected between the first and second (k×m)-bit data buses which forms a data transmission path between an arbitrary two of said plurality of m-bit I/O peripheral devices and the CPU, and a transmission control circuit for generating control signals responsive to a demand of data transmission from said CPU. The m-bit I/O peripheral devices, first and second data buses, data path switching circuit and transmission control circuit can be integrated on an extended board.

13 Claims, 11 Drawing Sheets

Fig. 5

| Transmission mode | DIR2 / OE0 | /OE13 | DIR1 | / OE1 | / OE2 | / OE3 |
|---|---|---|---|---|---|---|
| (a) WRITE 32bit | 1 | 0 | 0 | X | 1 | 1 | 1 |
| (b) READ 32bit | 0 | 0 | 0 | X | 1 | 1 | 1 |
| (c) WRITE 8bit 1st | 1 | 0 | 1 | X | 1 | 1 | 1 |
| (d) READ 8bit 1st | 0 | 0 | 1 | X | 1 | 1 | 1 |
| (e) WRITE 8bit 2nd | 1 | 0 | 1 | 1 | 0 | 1 | 1 |
| (f) READ 8bit 2nd | 0 | 0 | 1 | 0 | 0 | 1 | 1 |
| (g) WRITE 8bit 3rd | 1 | 0 | 1 | 1 | 0 | 0 | 1 |
| (h) READ 8bit 3rd | 0 | 0 | 1 | 0 | 0 | 0 | 1 |
| (i) WRITE 8bit 4th | 1 | 0 | 1 | 1 | 0 | 0 | 0 |
| (j) READ 8bit 4th | 0 | 0 | 1 | 0 | 0 | 0 | 0 |
| (k) TRANSFER 8bit 1st-2nd | X | 1 | 1 | 1 | 0 | 1 | 1 |
| (l) TRANSFER 8bit 2nd-1st | X | 1 | 1 | 0 | 0 | 1 | 1 |
| (m) TRANSFER 8bit 1st-3rd | X | 1 | 1 | 1 | 0 | 0 | 1 |
| (n) TRANSFER 8bit 3rd-1st | X | 1 | 1 | 0 | 0 | 0 | 1 |
| (o) TRANSFER 8bit 1st-4th | X | 1 | 1 | 1 | 0 | 0 | 0 |
| (p) TRANSFER 8bit 4th-1st | X | 1 | 1 | 0 | 0 | 0 | 0 |
| (q) TRANSFER 8bit 2nd-3rd | X | 1 | 1 | 1 | 1 | 0 | 1 |
| (r) TRANSFER 8bit 3rd-2nd | X | 1 | 1 | 0 | 1 | 0 | 1 |
| (s) TRANSFER 8bit 2nd-4th | X | 1 | 1 | 1 | 1 | 0 | 0 |
| (t) TRANSFER 8bit 4th-2nd | X | 1 | 1 | 0 | 1 | 0 | 0 |
| (u) TRANSFER 8bit 3rd-4th | X | 1 | 1 | 1 | 1 | 1 | 0 |
| (v) TRANSFER 8bit 4th-3rd | X | 1 | 1 | 0 | 1 | 1 | 0 |
| (w) WAIT | X | 1 | 1 | X | 1 | 1 | 1 |

X indicates "don't care"

Fig. 6

| Transmission mode | DIR2 | OE0 | OE13 | DIR4/OE4 | DIR5/OE5 | DIR6/OE6 | DIR7/OE7 |
|---|---|---|---|---|---|---|---|
| (a) WRITE 32bit | 1 | 0 | 0 | x | 1 | 1 | 1 |
| (b) READ 32bit | 0 | 0 | 0 | x | 1 | 1 | 1 |
| (c) WRITE 8bit 1st | 1 | 0 | 1 | x | 1 | 1 | 1 |
| (d) READ 8bit 1st | 0 | 0 | 1 | x | 1 | 1 | 1 |
| (e) WRITE 8bit 2nd | 1 | 0 | 1 | 0 | 1 | 1 | 1 |
| (f) READ 8bit 2nd | 0 | 0 | 1 | 1 | 0 | 1 | 1 |
| (g) WRITE 8bit 3rd | 1 | 0 | 1 | 0 | 1 | 0 | 1 |
| (h) READ 8bit 3rd | 0 | 0 | 1 | 1 | 1 | 0 | 1 |
| (i) WRITE 8bit 4th | 1 | 0 | 1 | 0 | 1 | 1 | 0 |
| (j) READ 8bit 4th | 0 | 0 | 1 | 1 | 1 | 1 | 0 |
| (k) TRANSFER 8bit 1st-2nd | x | 1 | 1 | 0 | 1 | x | 1 |
| (l) TRANSFER 8bit 2nd-1st | x | 1 | 1 | 1 | 0 | x | 1 |
| (m) TRANSFER 8bit 1st-3rd | x | 1 | 1 | 0 | x | 1 | 1 |
| (n) TRANSFER 8bit 3rd-1st | x | 1 | 1 | 1 | x | 0 | 1 |
| (o) TRANSFER 8bit 1st-4th | x | 1 | 1 | 0 | x | x | 1 |
| (p) TRANSFER 8bit 4th-1st | x | 1 | 1 | 1 | x | x | 0 |
| (q) TRANSFER 8bit 2nd-3rd | x | 1 | 1 | x | 0 | 1 | 1 |
| (r) TRANSFER 8bit 3rd-2nd | x | 1 | 1 | x | 1 | 0 | 1 |
| (s) TRANSFER 8bit 2nd-4th | x | 1 | 1 | x | 0 | x | 1 |
| (t) TRANSFER 8bit 4th-2nd | x | 1 | 1 | x | 1 | x | 0 |
| (u) TRANSFER 8bit 3rd-4th | x | 1 | 1 | x | x | 0 | 1 |
| (v) TRANSFER 8bit 4th-3rd | x | 1 | 1 | x | x | 1 | 0 |
| (w) WAIT | x | 1 | 1 | x | 1 | 1 | 1 |

X indicates "don't care"

5,511,229

DATA PROCESSING SYSTEM HAVING A SWITCHING NETWORK CONNECTING MULTIPLE PERIPHERAL DEVICES USING DATA PATHS CAPABLE OF DIFFERENT DATA BUS WIDTHS

BACKGROUND OF THE INVENTION

1. Field of the Invention

The present invention relates to a data processing apparatus comprising a central processing unit and peripheral devices with different data bus widths.

2. Description of the Prior Art

A data processing apparatus according to the prior art is described below with reference to FIG. 8. FIG. 8 is a block diagram of the data processing apparatus disclosed in U.S. Pat. No. 4,447,878. In FIG. 8, reference numerals each 65 and 66 denote a 16-bit data bus; numerals 67 and 68 denote an 8-bit data bus constituted by the lower 8 bits of a 16-bit data bus; numerals 69 and 70 denote an 8-bit data bus constituted by the upper 8 bits of a 16-bit data bus; numerals 71, 72, 73 and 74 each denote an 8-bit bus transceiver; numerals 76 to 79 each denote an 8-bit I/O peripheral device; numeral 80 denotes a 16-bit I/O central processing unit and numeral 75 denotes a 16-bit I/O peripheral device. The 8-bit bus transceivers 71 to 74 are devices for relaying data transmission by connecting two 8-bit data buses and a direction of data transmission and transmission state or off state of each of them are controlled by a control line.

It is to be noted that the term "line" is often used to indicate a bundle of lines in this specification.

FIG. 9 is a circuit of the 8-bit bus transceiver. When a logic value "H" is input to a control line /OE, the outputs of all the buffer gates are placed in their high resistive states and accordingly, each of the output terminals Y0 to Y7 is disconnected from each of the input terminals X0 to X7. When a logic value "L" is input to the control line/OE and a logic value "H" is input to another control line DIR, each of the buffer gates directing from the X side to the Y side is placed in an output enable state and the data input to the terminals X0 to X7 are thereby transmitted to the output terminals Y0 to Y7. When a logic value "L" is input to the control line/OE and a logic value "L" is input to the control line DIR, each of the buffer gates directing from the Y side to the X side is brought into an output enable state and data is transmitted from the terminals Y0 to Y7 to the terminals X0 to X7. 8-bit bus transceivers of this type are supplied as SN74AS245® by Texas Instrument Inc. and second source makers thereof.

Next, the operation of the data processing apparatus shown in FIG. 8 is explained below.

In a case where a data transmission is effected between any two arbitrary 8-bit I/O peripheral devices 76 to 79, the 8-bit data bus 68 is used. In a case where a data transmission is effected between the CPU 80 and any one of the 8-bit I/O peripheral devices 76 to 79, data paths are switched in accordance with whether each of addresses allocated to the respective data is odd or even since the position of the data to be processed in the CPU is altered from an upper byte to a lower byte or vice versa in accordance therewith. Namely, upon transmitting data of an even address, a data path constituted by 8-bit data buses 67 and 68 and 8-bit bus transceiver 71 is selected and a lower byte is used to process data in the CPU 80. In the case of an odd address data, data is transmitted through a data path constituted by the 8-bit data buses 69 and 68 and the 8-bit bus transceiver 73 and an upper byte is used to process data therein. If another bus transceiver 74 is used instead of transceiver 73, data transmission is effected through a data path constituted by the 8-bit data buses 69, 67 and 68 and the 8-bit bus transceivers 74 and 71. To transmit data between the CPU 80 and the 16-bit I/O peripheral device 75, a data path constituted by two 16-bit data buses 65 and 66 and two 8-bit bus transceivers 71 and 72 is used. In a case where the CPU 80 transmits 16-bit data to any one of the 8-bit I/O peripheral devices 76 to 79, two 8-bit data units divided from one 16-bit data unit are sequentially transmitted. The case of a (2×8)-bit data bus is explained above; however, a (4×8) or (2×16) bit data bus is available in a manner similar to the above.

However, the conventional apparatus mentioned above has the following problems to be solved. Since all of the 8-bit peripheral devices are connected to the 8-bit data bus 68 corresponding to the lower byte, electrical loads are concentrated with driving circuits which drive data buses of the devices connected to the 8-bit data bus of the lower byte. The circuits which drive the 8-bit data buses of the lower byte are 8-bit I/O peripheral devices, 16-bit I/O peripheral devices and 8-bit bus transceivers. Due to this, the number of connectable 8-bit and/or 16-bit I/O peripheral devices is restricted. In the following, a device for driving each data bus such a CPU, peripheral device, 8-bit bus transceiver or register is referred to as a data bus driving device. In order to reduce the electrical load of each data bus driving device, it is considered that 8-bit peripheral devices are grouped into two in such a manner that each of two groups gives a substantially equal load to either of two 8-bit data buses corresponding to upper and lower bytes of the 16-bit data bus. However, a mere change in the connection relationship from one 8-bit data bus to another needs a relay using the CPU to transmit data between 8-bit peripheral devices of upper and lower bytes and control programs become complex since 8-bit data exists in two ways of upper and lower bytes.

Furthermore, in the conventional data processing, the member of machine cycles of the CPU is increased when the CPU transmits 16-bit data to an 8-bit I/O peripheral device since the data must be sequentially transmitted in 8 bit units in two time periods.

SUMMARY OF THE INVENTION

An object of the present invention is therefore to provide a data processing apparatus capable of reducing an electrical load of each data bus driver and the number of machine cycles related to a data transmission by the CPU.

Another object of the present invention is to provide an extended board connectable to a CPU which comprises a plurality of peripheral devices and a data transmission means for transmitting data between the CPU and one of the plurality of peripheral devices or between two of the peripheral devices.

In order to achieve these objects, according to the present invention, there is provided a data processing apparatus comprising: a first (k×m)-bit data bus wherein k is a byte count and m is a bit length of one byte, a plurality of m-bit I/O peripheral devices each of which is connected to at least one of m-bit data buses belonging to a first group consisted of first to k-th m-bit data buses obtained by dividing said first (k×m)-bit data bus into said first to k-th m-bit data buses;

a second (k×m)-bit data bus, a (k×m)-bit I/O central processing unit connected to said second (k×m)-bit data bus which is divided into (k+1)-th to (k+m)-th m-bit data buses consisting a second group of m-bit data buses, a data path switching means connected between said first and second (k×m)-bit data buses which forms a data transmission path between an arbitrary two of said plurality of m-bit I/O peripheral devices and said CPU, and transmission control means for generating control signals responsive to a demand of data transmission from said CPU.

According to this composition, it becomes possible to connect a plurality of m-bit I/O peripheral devices to a plurality of m-bit data buses in a dispersed manner and, thus, an electrical load of each data bus driver can be reduced.

Further, upon transmitting data between two of the plurality of m-bit I/O peripheral devices connected to m-bit data buses of the first group, respectively, two of m-bit data buses to which two m-bit I/O peripheral devices are connected are connected by said data path switching means. In a preferred embodiment of the present invention, two of m-bit data buses belonging to the first group are connected by m-bit bus transceivers of the first group or by m-bit bus transceivers of the first group and (2k+1)th m-bit data bus so that data transmission therebetween can be made. Accordingly, data transmission can be effected without any relay by the CPU.

Also, in a case where the CPU sends and receives (k'×m)-bit data (k' is an integer satisfying k≧k'≧2) to and from one of m-bit I/O peripheral devices, the (k'×m)-bit data is temporarily stored in k' of k registers each connected to each of m-bit data buses in unit of m bits and, accordingly, the CPU can send or receive the (k'×m)-bit data at one time without dividing the number of same. Thus, the machine cycles of the CPU can be reduced.

On the other hand, according to the present invention, there is provided an extented board connectable to a (k×m)-bit I/O CPU wherein k is a byte count and m is a bit length of one byte comprising: a first (k×m)-bit data bus which is divided into m-bit data buses, a plurality of m-bit I/O peripheral devices each connected to one of said m-bit data buses of said first (k×m)-bit data bus, a second (k×m)-bit data bus to be connected to a (k×m)-bit data bus of said (k×m)-bit I/O CPU which is divided into m-bit data buses, a data path switching means connected between said first and second (k×m)-bit data buses which form a data transmision path between an arbitrary two of said plurality of m-bit I/O peripheral devices and said CPU, and a transmission control means for generating control signals responsive to a demand of data transmission from said CPU.

The extended board, when mounted on the CPU, can extend functions of the CPU and it becomes possible to smoothly transmit data of various data widths between the CPU and one of the m-bit peripheral devices or between an arbitrary two peripheral device.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiment of the present invention will be described below in detail with reference of the attached drawings.

Figure 1:
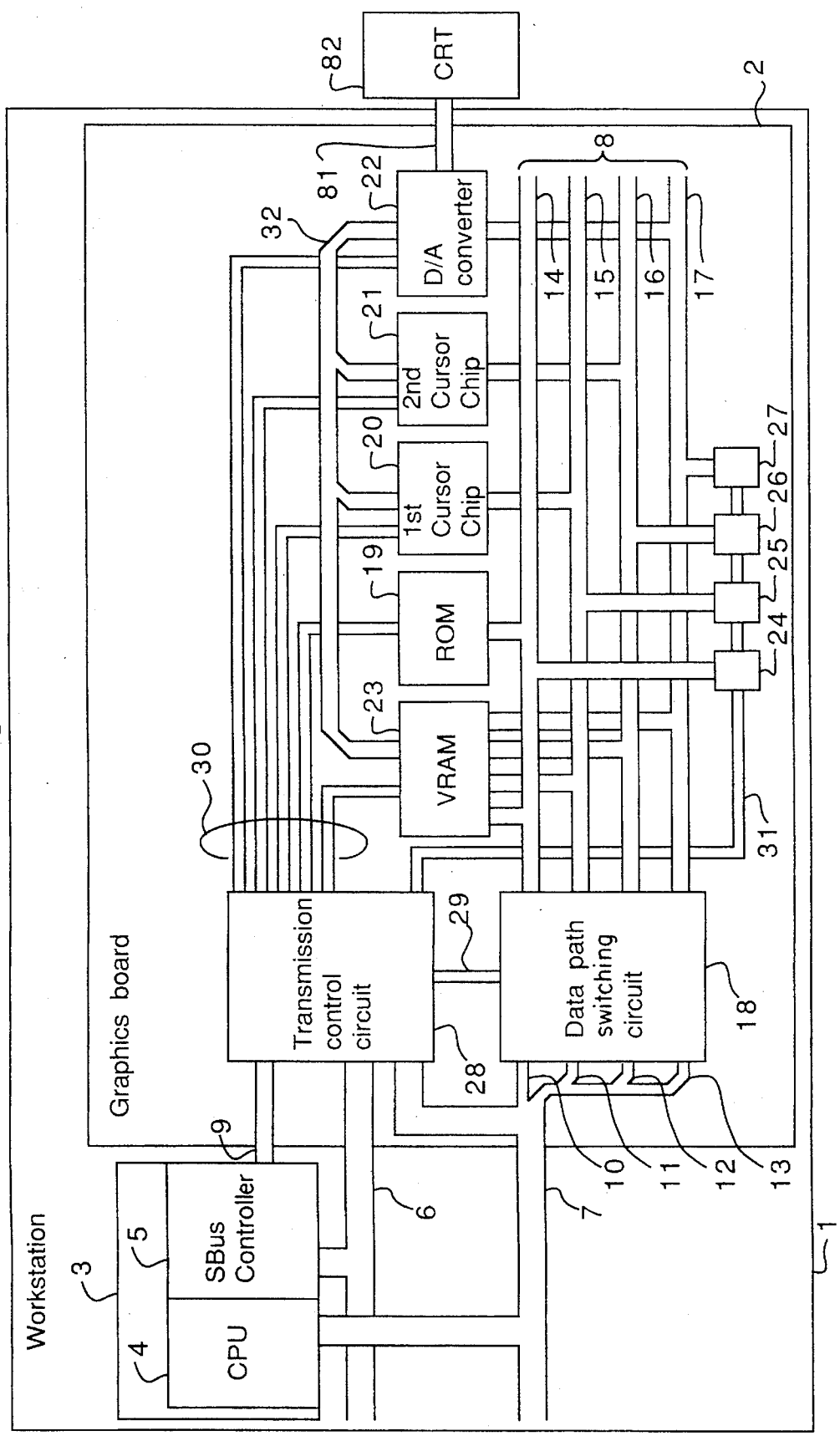
FIG. 1 is a block diagram of a data processing apparatus according to a preferred embodiment of the present invention.

FIG. 1 shows a block diagram of the data processing apparatus according to a preferred embodiment of the present invention.

The data processing apparatus is comprised of a computer of the workstation type 1 including a block 3 comprised of a CPU (central processing unit) 4 and an SBus controller 5. In this computer, a graphics board 2 according to the preferred embodiment of the present invention is mounted therein.

This graphics board 2 provides with a transmission control circuit 28, a data path switching circuit 18, a 32-bit I/O peripheral device 23 used for a VRAM, four 8-bit I/O peripheral devices 19 to 22 respectively used for a ROM, first and second cursor chips and a D/A converter for display, and four 8-bit registers 24 to 27.

An SBus controlled by the SBus controller 5 is comprised of a 28-bit address bus 6, 32-bit data buses 7 and 8, and an SBus control signal line 9. The 32-bit data bus 7 is divided into four 8-bit data buses 10 to 13 and another 32-bit data bus 8 is also divided into four 8-bit data buses 14 to 17. Further, a reference numeral 29 denotes a control signal line for the data path switching circuit 18, a reference numeral 30 denotes a bundle of control signal lines including respective address lines for the four 8-bit I/O peripheral devices 19 to 22 and one 32-bit I/O peripheral device 23, and reference numerals 31 and 32 respectively denote a control signal line for four 8-bit registers 24 to 27 and a transmitting line of display pixel data. Display pixel data from the VRAM 23 and image data of cursors from the first and second cursor chips 20 and 21 are input to the D/A converter 22 via the transmitting line 32 and this data, which is converted from digital to analog by the D/A converter 22, is input to a CRT 82 via a signal line 81 to display corresponding images thereon.

Figure 2:
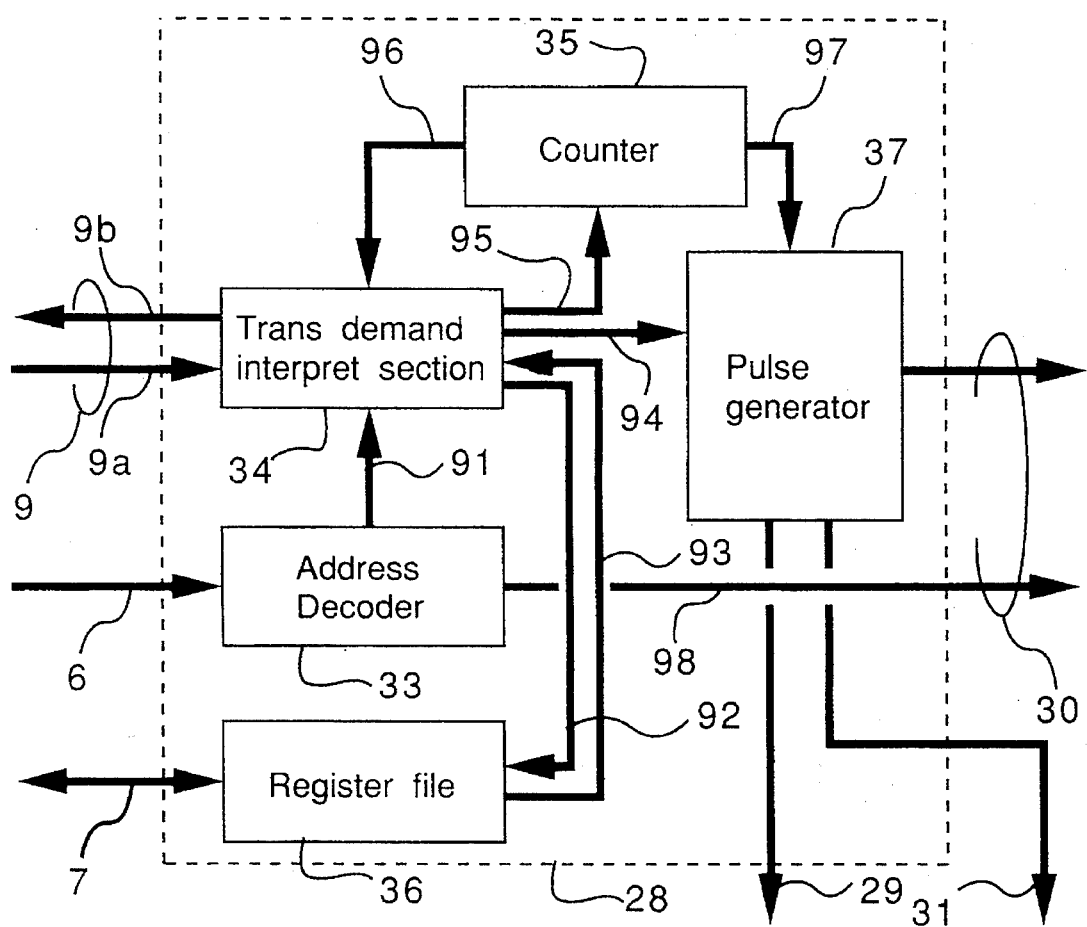
FIG. 2 is a block diagram of a transmission control circuit shown in FIG. 1.

FIG. 2 shows a concrete composition of the transmission control circuit 28.

The transmission control circuit 28 is comprised of address decoder 33, transmission demand interpret section 34, counter 35, controlling register, i.e. register file, for transmission control 36 and pulse generator 37. The SBus control signal line 9 is comprised of input and output signal lines 9a and 9b.

The SBus controller 5 sends out respective signals Sel' (signal for demanding a transmission by the graphics board 2), AS' (signal indicating a stable state of the address bus 6), R/W (signal for selecting either READ or WRITE) and Size (signal for indicating a number of bits the data to be transmitted, namely, either of 8 bits, 16 bits or 32 bits) on the input signal line 9a through which they are input to the transmission demand interpret circuit 34.

Further, the SBus controller 5 sends out addresses allocated to the register file 36 and peripheral devices 19 to 23 on the 28-bit address bus 6 and inputs them to the address decoder 33. The address decoder 33 decodes an input address and transmits information regarding the device designated thereby among the register file 36 and peripheral devices 19 to 23 to the transmission demand interpret section 34 via a signal line 91. Also, the address decoder picks up a part of the signal on the 28-bit address bus 6 and sends it out on a signal line 98 as an internal address of the designated device.

The transmission demand interpret circuit 34 receives a signal sent through signal lines 9a and 91, identifies devices from and to which data are transmitted and the width of the data to be transmitted and sends out information related to them on a signal line 94. Further, it commands start, end and reset of counting to the counter 35 via a signal line 95. The counter 35 carries out a counting operation in accordance with the information sent through the signal line 95 and sends a count value, via respective signal lines 97 and 96, to the pulse generator 37 and transmission demand interpret section 34.

Upon transmitting data between the register file 36 and the CPU, the data is fed to the 32-bit data bus 7 to input into or output from the register file 36. Information to be written from the CPU 4 into the register file 36 includes information indicating the devices from and to which data is transmitted, the data width, the number of transmissions and a flag indicating a transmission between two of the peripheral devices 19 to 23. Data to be transmitted from the register file to the CPU 4 is a flag indicating a transmission between two of the peripheral devices 19 to 23 or an end thereof. The register file 36 sends information received from the CPU 4 and the contents of the flag to the transmission demand interpret section 34 via a signal line 93. The transmission demand interpret section 34 sends information indicating an in-transmission state or the end of transmission, via a signal line 92, to the register file 36.

The pulse generator 37 generates control signals necessary for the control signal line 29 of the data path switching circuit 18, the control signal line 30 of the peripheral devices 19 to 23 and the control signal line 31 of the 8-bit I/O register based upon time information sent from the counter 35 via a signal line 97 and the information sent from the transmission demand interpret section 34 via a signal line 94.

The transmission demand interpret section 34 sends out a signal Ack (which indicates a completion of a transmission and/or a fetching of transmission data) to the CPU 4 upon reading.

Next, the operation of the transmission control circuit 28 is explained below. When a demand for a data transmission related to the graphics board 2 is generated, the transmission demand is sent from the CPU 4 to the SBus controller 5 and then to the transmission control circuit 28. The transmission demand to the transmission control circuit 28 is transmitted through the SBus control signal line 9a and the 28-bit address bus 6. In the transmission control circuit 28, the transmission demand interpret section 34 identifies a device from which data is to be transmitted, a device to which data is to be transmitted, the data width and a number of transmission based upon information sent from the SBus control signal line 9, 28-bit address bus 6 and control register 36. When the transmission demand is sent, the graphics board 2 is either in a waiting state for the demand or in a transmitting state in accordance with the latest transmission demand. When it is impossible to obey the new transmission demand in the transmitting state of the graphics board 2, the transmission demand interpret section 34 sends information indicating the impossibility of transmission to the SBus controller 5 by the SBus control signal 9b. If data transmission in accordance with the new demand is possible, the transmission demand interpret section 34 makes the counter 35 start and enters to the transmission operation. The pulse generator 37 generates control signals necessary for the control signal lines 29, 30 and 31 of the data path switching circuit, peripheral devices and 8-bit I/O register based on time information in transmission operation and the information given from the transmission demand interpret section 34. The interpret section 34 receives time information from counter 35 and uses the it to determine a time to output a response information as the SBus control signal 9b. Also, it resets the counter 35 as an ending of the transmission operation when a time information predetermined to be as an ending time is sent and, then, stops the counter 35 to bring the graphics board 2 into a waiting state for the next transmission demand if no such demand is sent.

Figure 3A:
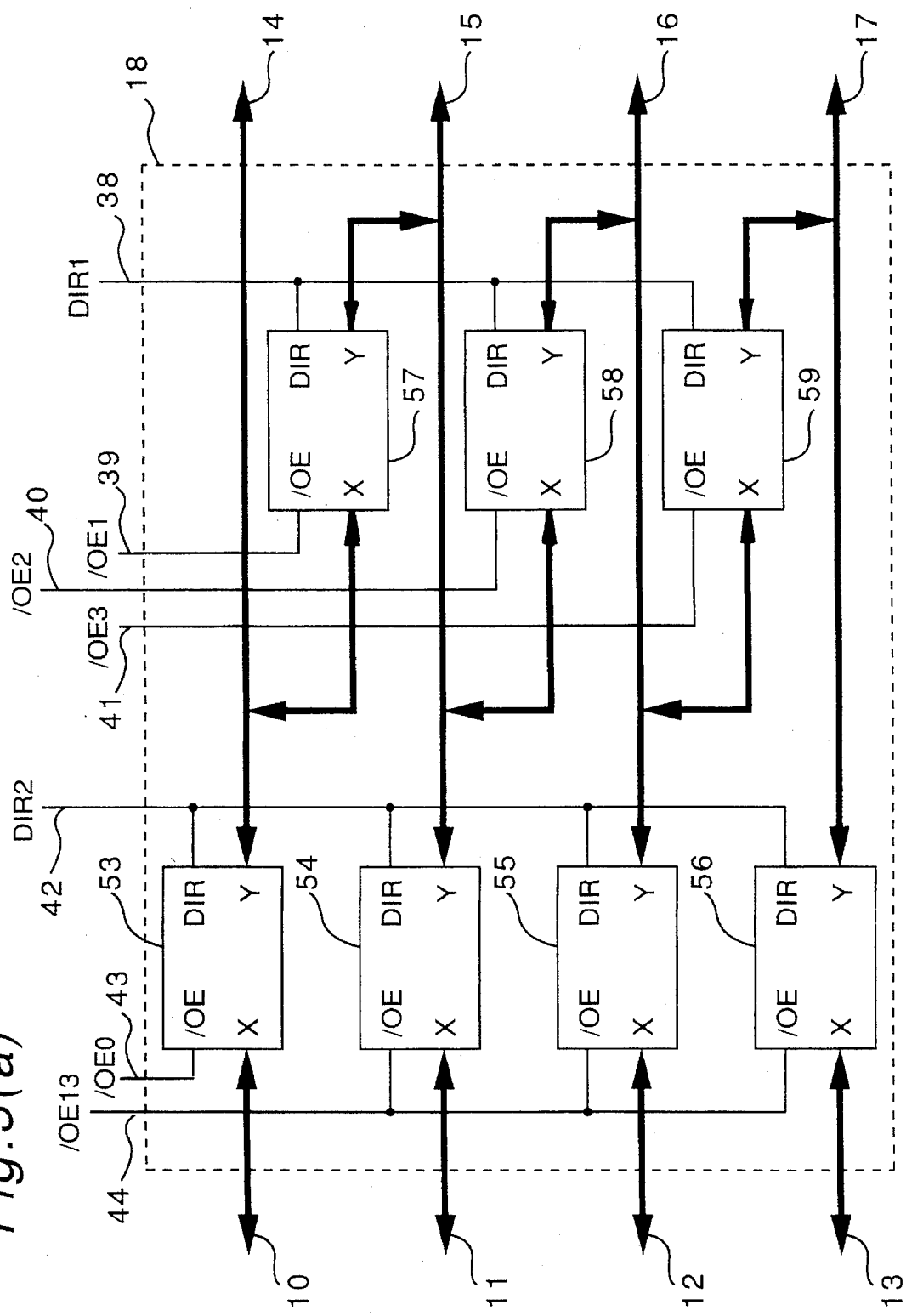
FIGS. 3(a) and 3(b) are block diagrams of first and second examples of a data path switching circuit shown in FIG. 1.
Figure 3B:
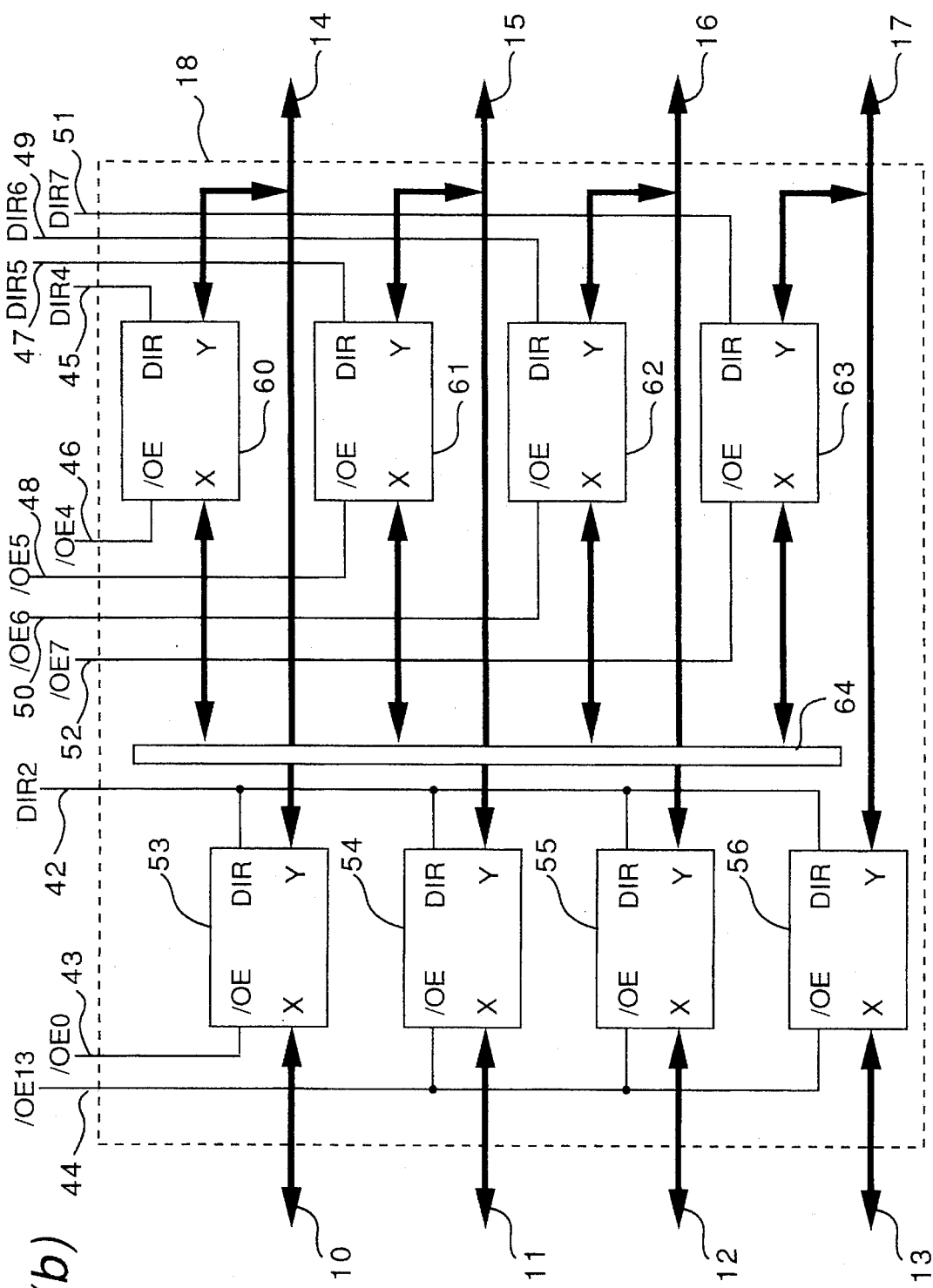

The operation of the data path switching circuit 18 and the flow of data upon a data transmission are explained with reference of FIGS. 3(a), 3(b), 4(a)—(a) to 4(b)-(v), 5 and 6. FIGS. 3(a) and 3(b) show compositions of the data path switching circuit 18, respectively. In these figures, signal lines DIR 1,2, DIR 4–7, /OE 0–7 and /OE 13 are included in the control signal line 29 shown in FIG. 1 or 2. Reference numerals 53 to 63 denote 8-bit bus transceivers each having a composition as shown in FIG. 9, respectively, and 64 denotes an 8-bit data bus.

Figures 1, 4A:
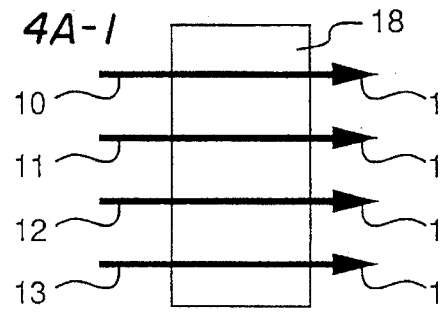
FIGS. 4(a) and 4(b) are; diagrams showing all of the data paths formed by the data path switching circuit.
Figures 2, 4A:
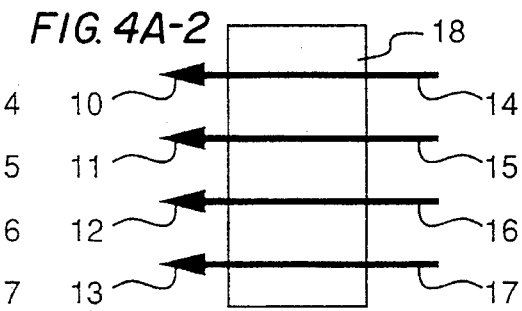
Figures 3, 4A:
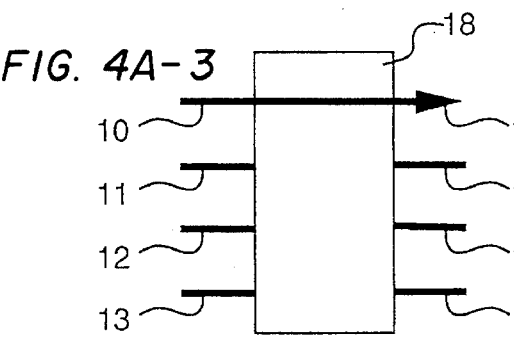
Figures 4, 4A:
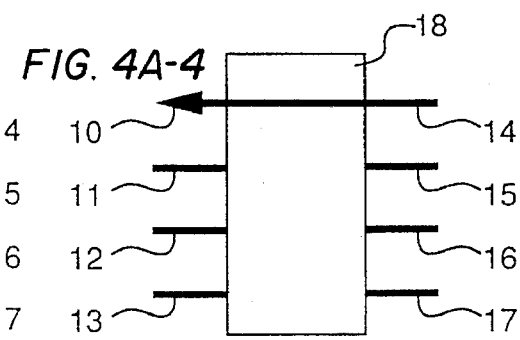
Figures 4, 4A, 5:
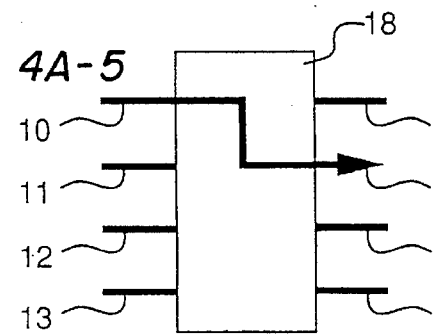
FIGS. 5 and 6 are truth tables for showing logic values of control signals to be given in the first and second examples of the data path switching circuit, respectively.
Figures 4, 4A, 5, 6:
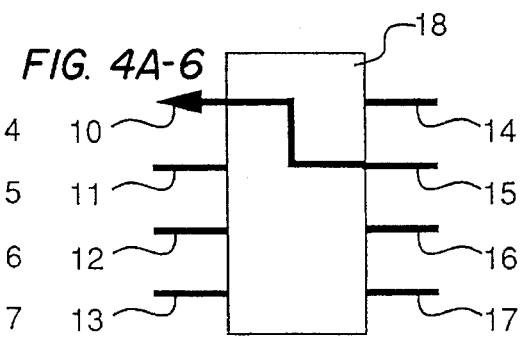
Figures 4, 4A, 5, 6, 7:
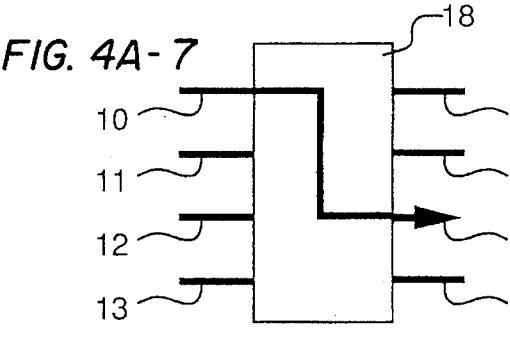
Figures 4, 4A, 5, 6, 7, 8:
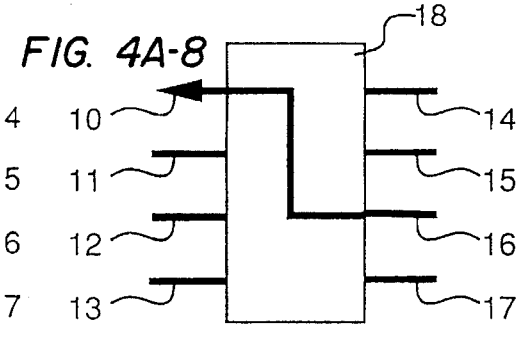
FIG. 8 is a block diagram for showing a conventional data processing apparatus.
Figures 4, 4A, 5, 6, 7, 8, 9:
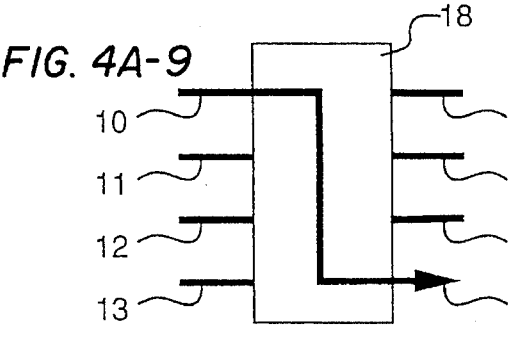
FIG. 9 is a block diagram for showing a composition of an 8-bit bus transceiver.
Figures 4, 4A, 5, 6, 7, 8, 9, 10:
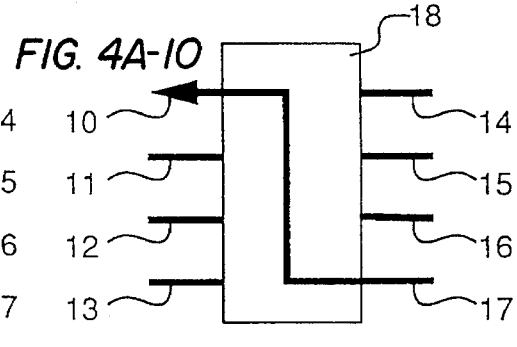
Figures 1, 4B:
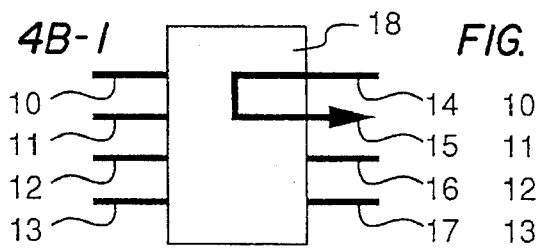
Figures 2, 4B:
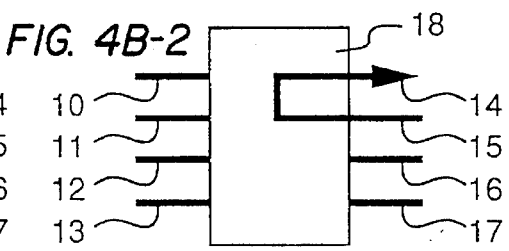
Figures 3, 4B:
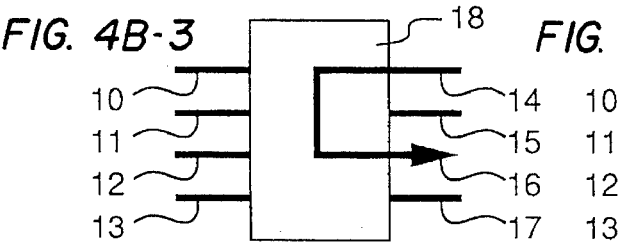
Figures 4, 4B:
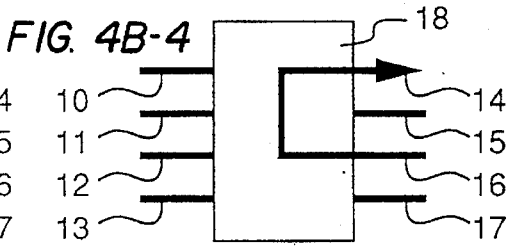
Figures 4, 4B, 5:
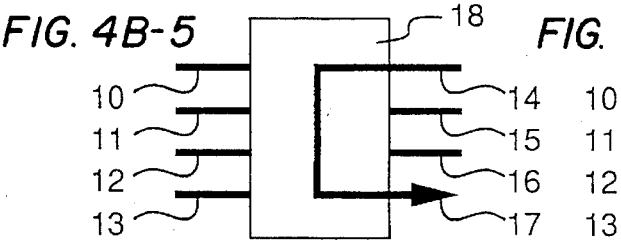
Figures 4, 4B, 5, 6:
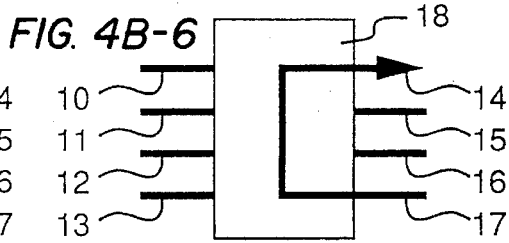
Figures 4, 4B, 5, 6, 7:
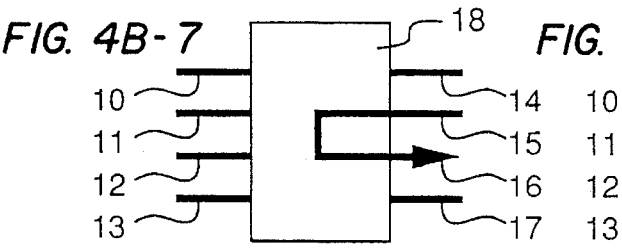
Figures 4, 4B, 5, 6, 7, 8:
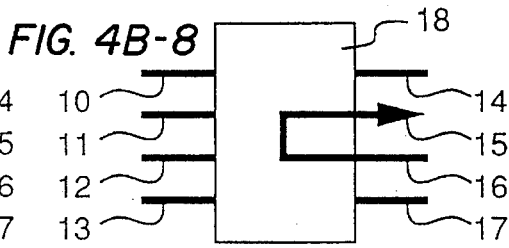
Figures 4, 4B, 5, 6, 7, 8, 9:
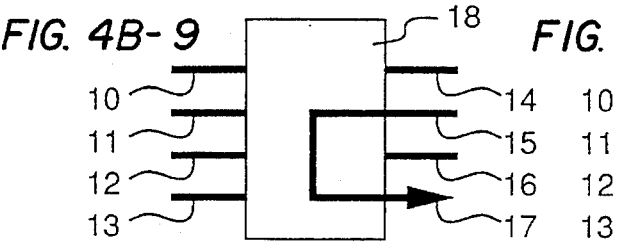
Figures 4, 4B, 5, 6, 7, 8, 9, 10:
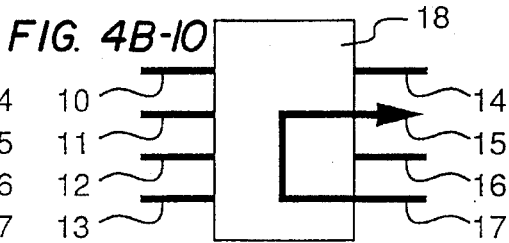
Figures 4, 4B, 5, 6, 7, 8, 9, 10, 11:
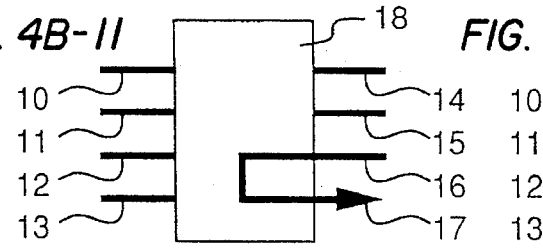
Figures 4, 4B, 5, 6, 7, 8, 9, 10, 11, 12:
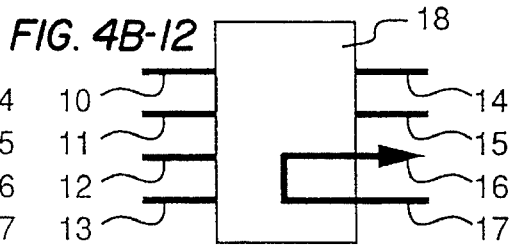

FIGS. 4(a)—(a) to 4(b)-(v); all of the data paths formed by the data path switching means 18 in the present preferred embodiment. FIG. 5 is a table showing logic values given to respective control signals in the composition shown in FIG. 3(a), and FIG. 6 is a table similar to FIG. 5 in the case of FIG. 3(b). It is to be noted that the cases shown in FIGS. 4(a)—(a) to 4(b)-(v) correspond to lines (a) to (v) of FIG. 5 on a one basis to one.

When the data path switching circuit 18 forms a 32-bit data transmission path in such a case that data transmission is carried out between the CPU 4 and the VRAM 23 as a 32-bit peripheral device, the data transmission path is formed as indicated by FIGS. 4(a)—(a) or 4(a)–(b). In this case, since signals /OE 0 and /OE 13 become 0 and /OE 1 to /OE 7 become 1, four 8-bit bus transceivers 53 to 56 are placed in their output enable states and the other transceivers are placed in their cut-off states. The direction of data transmission is controlled by the signal DIR 2.

When the data path switching circuit forms an 8-bit data transmission path connecting the 8-bit data bus 10 to either one of 8-bit data buses 14 to 17 in such a case that data transmission is carried out between the CPU 4 and one 8-bit peripheral device, the data transmission path becomes any one of the cases shown in FIGS. 4(a)–(c) to 4(a)–(j). In this case, since the control signal /OE 0 becomes 0 and /OE 13 becomes 1, the 8-bit bus transceiver 53 is placed in its output enable slate and transceivers 54 to 56 are cut off. Control signals /OE 1 to OE 7 are respectively switched in accordance with the data path to be set, and, among the 8-bit bus transceivers 57 to 63, one which is located at a position to relay the data transmission path is placed in its output enable state. In order to control the direction of data transmission, it is necessary to control two or more control signal lines.

If it is necessary to form an 8-bit data transmission path connecting either one of 8 bit data buses 11 to 13 with either one of 8 bit data buses 14 to 17, each of the bus transceivers 54 to 56 of the data path switching circuit 18 is controlled by individual control signals /OE, separately.

When the data transmission path switching circuit 18 forms an 8-bit data transmission path between two of four 8-bit data buses 14 to 17 in such a case that data transmission is carried out between two of 8-bit peripheral devices connected to respective 8-bit data buses, the data transmission path becomes one of the cases shown in FIGS. 4(*b*)–(*k*) to 4(*b*)–(*v*). In this case, since the control signals /OE 0 and /OE 1 become 1, 8-bit bus transceivers 53 to 56 are cut off and also the graphics card 2 is cut off from the 32-bit data bus 7. Accordingly, it becomes possible for other devices connected to the 32-bit data bus 7 to use the bus 7. Control signals /OE 1 to /OE 7 are chosen in accordance with the data path to be selected, and one of 8-bit bus transceivers 57 to 63 which is located so as to relay the data transmission path is placed in its output enable state. In order to control the direction of transmission, DIR 1 is controlled in the data path switching circuit as shown in FIG. 3(*a*) and, in the composition shown in FIG. 3(*b*), it is necessary to control the DIR signals of two 8-bit bus transceivers forming an 8-bit data transmission path.

Besides, in a waiting state, /OE 0, /OE 13 and /OE 1 to /OE 7 become 1 and all 8-bit bus transceivers of the data path switching means 18 are cut off, as indicated by line (w) of either FIG. 5 or 6, for the reason that the data path switching means 18 should not output any data to the 32-bit data bus 7 and that consumption of power should be reduced. Next, four cases of the transmission operation are explained.

(1) First case

In this case, the CPU 4 transmits 32-bit data to the VRAM 23 as a 32-bit peripheral device. The VRAM 23 forms one device in an address space of the SBus when observed from the CPU 4. At first, a transmission demand from the CPU 4 is transmitted to the transmission control circuit 28. At this time, the 28-bit address bus 6 indicates a value allocated to the VRAM 23. Also, data to be transmitted is output to the 32-bit data bus 7 from the CPU 4. Here, it is assumed that the graphics board 2 is in a waiting state for a transmission demand. The transmission demand interpret section 34 recognizes a request to transmit 32-bit data on the 32-bit data bus 7 to the VRAM based on information sent through the SBus control signal line 9*a* and 28-bit address bus 6. Then, it makes the counter 35 start and enters into a transmission operation. A request is transmitted from the transmission demand interpret section 34 to the pulse generator 37 to transmit 32-bit data on the 32-bit data bus 7 to the VRAM 23 via the signal line 94 and the pulse generator 37 varies the control line (a part of the control signal line) of the VRAM 23 and the control signal line 29 of the data path switching means 18 at a proper time taking into time information generated during data transmission which is sent from the counter 35 via the signal line 97. Namely, at first, the control line 29 of the data path switching means 18 is set at such a logic value as indicated by line (*a*) of FIG. 5 or 6. Thus, the data path switching means 18 forms a data transmission path as shown in FIG. 4(*a*)—(*a*) and, accordingly, the 32-bit data sent through the 32-bit data bus 7 is output to the 32-bit data bus 8. The control line of the VRAM is controlled so that the 32-bit data is written thereinto when the 32-bit data bus 8 becomes stable. When the data fetch by the VRAM is completed, the transmission demand interpret section 34 outputs a response indicating the completion of transmission to the SBus control signal line 9*b* and, if no next transmission demand exists, brings the graphics board 2 into a waiting state by setting the control line 29 of the data path switching circuit at a logic value indicated by line (w) of FIG. 5 or 6 after ending the data output by the peripheral device 22 to the 8-bit data bus 17 and cutting off the connection therebetween.

(2) Second case

In this case, the D/A converter for display 22 as an 8-bit I/O peripheral device transmits 8-bit data to the CPU 4. The D/A converter 22 is recognized as one device in an SBus address space by the CPU 4. At first, a transmission demand is sent from the CPU 4 to the transmission control device 28. At this time, the 28-bit address bus 6 carries a value allocated to the D/A converter 22. It is assumed that the graphics board 2 is in a waiting state for the transmission demand. The transmission demand interpret section 34 recognizes a request to transmit 8-bit data read out of the D/A converter 22 to the 8-bit data bus 10 based upon the SBus control signal 9*a* and information given by the 28-bit address bus 6. The transmission demand interpret section 34 enters into a transmission operation while making the counter 35 start. A request is transmitted from the transmission demand interpret section 34 to the pulse generator 37 via the signal line 94 that 8-bit data should be read out and transmitted to the 8-bit data bus 10. The pulse generator 37 varies the control line of the D/A converter 22 (a part of the control line 30) and the control line 29 of the data path switching means 18 at a proper time in accordance with time information generated during data transmission which is sent from the counter 35 via the signal line 97. Namely, at first, the control line of the D/A converter is controlled to command the D/A converter to output 8-bit data and, thus, the 8-bit data is output to the 8-bit data bus 17. At the same time, the control line 28 of the data path switching circuit is set at a logic value as indicated by line (*j*) in FIG. 5 or 6 and, thus, the data path switching means 18 forms a data transmission path as indicated by FIG. 4(*a*)–(*j*) to output 8-bit data on the 8-bit data bus 17 to the 8-bit data bus 10. When the 8-bit data bus 10 becomes stable, the transmission demand interpret section sends a response information indicating completion of data transmission and effectiveness of data to the SBus control signal 9*b*, and the CPU 4 fetches the data of the 8-bit data bus 10 in response thereto. The transmission demand interpret section 34 makes the D/A converter 22 stop the data output to the 8-bit data bus 17 and cuts off the connection therebetween when the data fetch by the CPU 4 is completed. Thereafter, the graphics board 2 is brought into a waiting state by setting the control line 29 of the data path switching means 18 at a logic value indicated by line (w) of FIG. 5 or 6.

(3) Third case

In this case, data transmission is carried out from the ROM 19 (as an 8-bit I/O peripheral device) to another 8-bit I/O peripheral device 20. This data transmission can be considered as a kind of so called direct memory access since the CPU 4 is not related thereto. It is necessary to write information indicating devices from and to which data is transmitted, data width and number of data transmission into the controlling register 36 before starting the data transmission. In this case, the device from which data is transmitted is the ROM 19, the device to which data is transmitted is the first cursor chip 20, the data width is 8 bits and the number of transmission is one. When the CPU 4 has written values indicating the data transmission into the controlling register 36, the transmission demand interpret section 34, after having received an indication via the signal line 93, recognizes the information registered in the register and enters into a data transmission operation after making the counter 35 start via the control line 95. Since the CPU 4 is not related to the data transmission, the transmission demand interpret section 34 outputs a response information indicating the end of transmission to the SBus control line 9b as soon as it enters into the data transmission operation to release the CPU 4 from a waiting state for further response information. Since the 32-bit data bus 7 is cut off from the data path switching means 18 during the transmission operation between the peripheral devices, the CPU 4 can carry out another operation using the 32-bit data bus 7.

However, until the data transmission between peripheral devices on the graphics board 2 is ended or stopped, the CPU 4 is forced to wait even if it transmits the next data transmission demand to the transmission control circuit 28 and, when the waiting time exceeds a predetermined upper limit, a response information indicating an impossibility of data transmission is output to the SBus control signal line 9b and, accordingly, the demand is not accepted.

Now, just after entering into the transmission operation, it is transmitted from the transmission demand interpret section 34 to the pulse generator 37 via the signal line 94 to transmit 8-bit data from the ROM 19 to the first cursor chip 20 and the pulse generator 37 controls the control lines of the peripheral devices 19 and 20 and the control line 29 of the data path switching circuit 18. Namely, at first, the control line of the ROM 19 is controlled to command the ROM 19 to output 8-bit data and, thus, the 8-bit data is output to the 8-bit data bus 14. At the same time, the control line 29 of the data path switching circuit 18 is set at a logic value as indicated by line (k) of FIG. 5 or 6. Thus, the data path switching circuit 18 forms a data transmission path as shown by FIG. 4(b)-(k) and, accordingly, the 8-bit data on the 8-bit data bus 14 is output to the 8-bit data bus 15. When the 8-bit data bus 15 becomes stable, the control line of the first cursor chip 20 is controlled so that the 8-bit data is written thereinto. When the data fetch by the device 20 is completed and if no next transmission demand exists, the peripheral device 22 is cut off from the 8-bit data bus 17 by stopping data output and the control line of the data path switching circuit 18 is set at a logic value as indicated by (W) line of FIG. 5 or 6 to bring the graphics board 2 into a waiting state.

(4) Fourth case

Next, it is explained with reference of FIGS. 7(a)–7(d) that the CPU 4 transmits 16-bit data to the 8-bit I/O peripheral device 21 i.e. the second cursor chip. FIGS. 7(a)–7(d) show the sequential flows of data in the case that the CPU 4 transmits 16-bit data to the 8-bit peripheral device 21. In this data transmission, 8-bit I/O registers 24 and 25 are used to perform a serial to parallel transformation of data. The peripheral device 21 is recognized as one device in an address space of the SBus by the CPU 4. At first, a transmission demand is transmitted to the transmission demand interpret circuit 28. At this time, the 28-bit address bus 6 indicates a value allocated to the peripheral device 21. Also, 16-bit data to be transmitted is output to two 8-bit data buses 10 and 11 as parts of the 32-bit data bus 7 from the CPU 4. If the graphics board 2 is in a waiting state for a transmission demand, the transmission demand interpret circuit 34 recognizes the request to transmit 16-bit data on the two 8-bit data buses 10 and 11 to the peripheral device 21 based on information given by the SBus control signal 9a and the 28-bit address bus 6. Then, it makes the counter 35 start via the signal line 95 to enter a transmission operation. Further, the interpret section 34 transmits it the request to the pulse generator 37 via the signal line 94 that the 16-bit data on the two 8-bit data buses 10 and 11 is to be transmitted to the peripheral device 21.

Figure 7A:
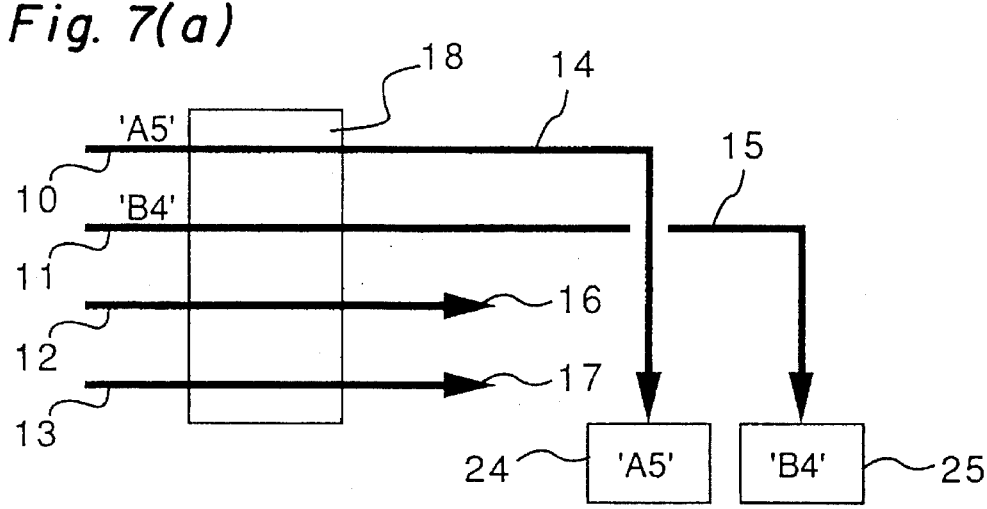
FIGS. 7(a)-7(c) show sequential data flows upon transmitting 16-bit data to two 8-bit peripheral devices.

The pulse generator 37 varies the control line of the peripheral device 21, control lines 31 of the 8-bit I/O registers 24 and 25 and control line 29 of the data path switching circuit at a suitable timing in accordance with the time information from the counter 35. Namely, at first the control line 29 of the data path switching means 18 is set at a logic value indicated by line (a) of FIG. 5 or 6 and, thereby, a data path as indicated by FIG. 4(a)—(a) is formed. As shown in FIG. 7(a), 16-bit data on two 8-bit data buses 10 and 11 as parts of the 32-bit data bus 7 is transmitted to two 8-bit data buses 14 and 15 and, when these two buses 14 and 15 become stable, the control lines 31 of the 8-bit I/O registers 24 and 25 is controlled so that the 16-bit (in sum) data is written into two 8-bit registers 24 and 25.

Figure 7B:
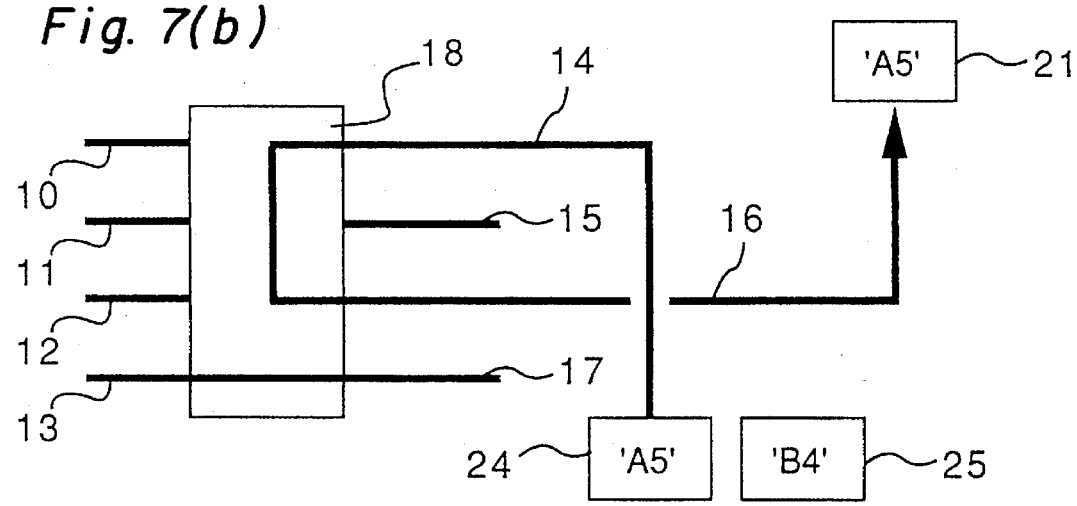
Figure 7C:
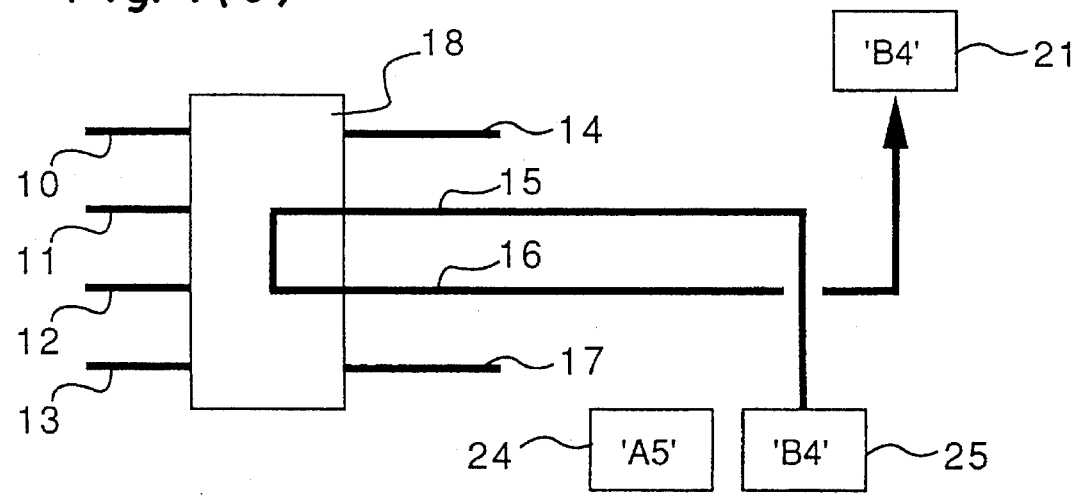
Figure 8:
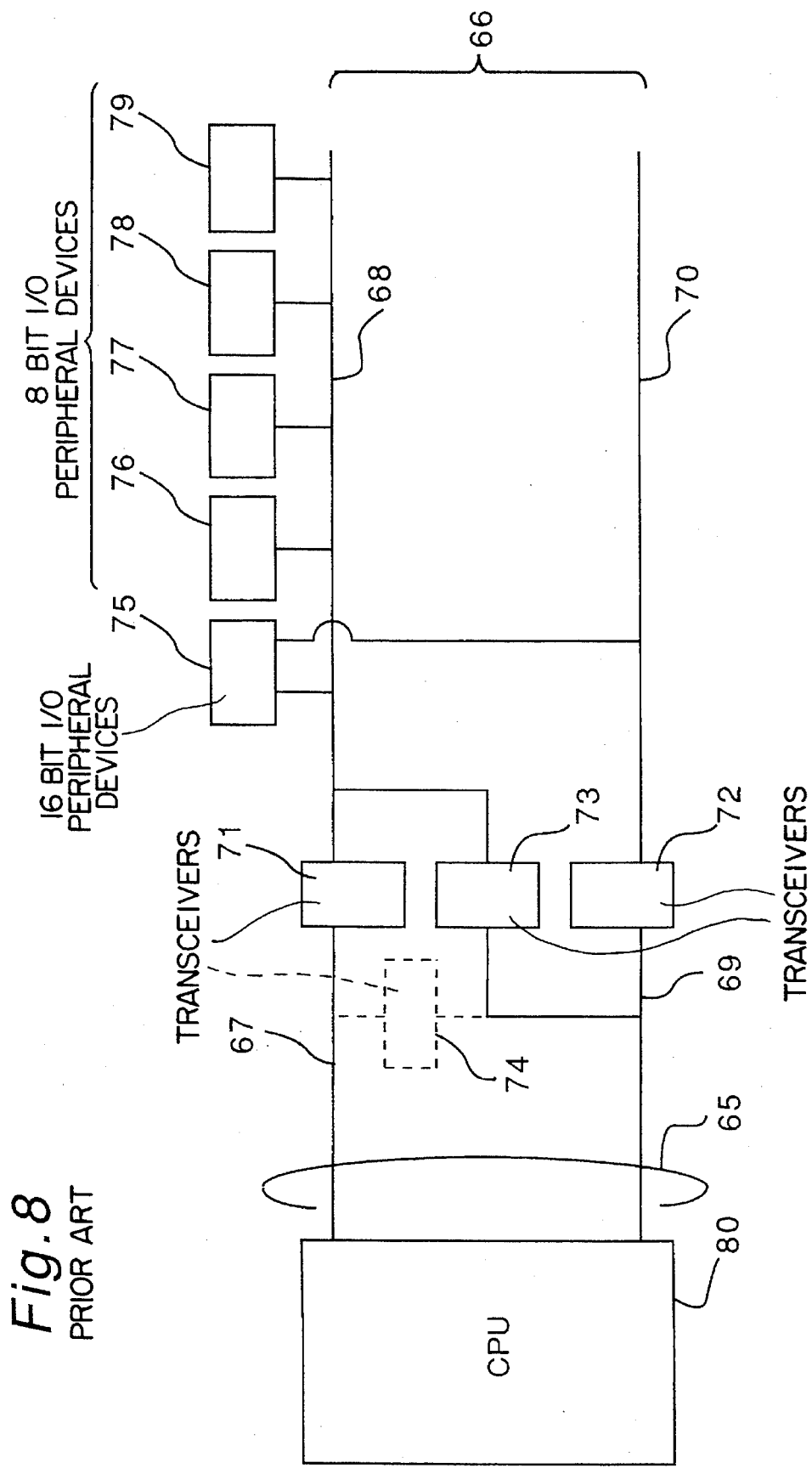
Figure 9:
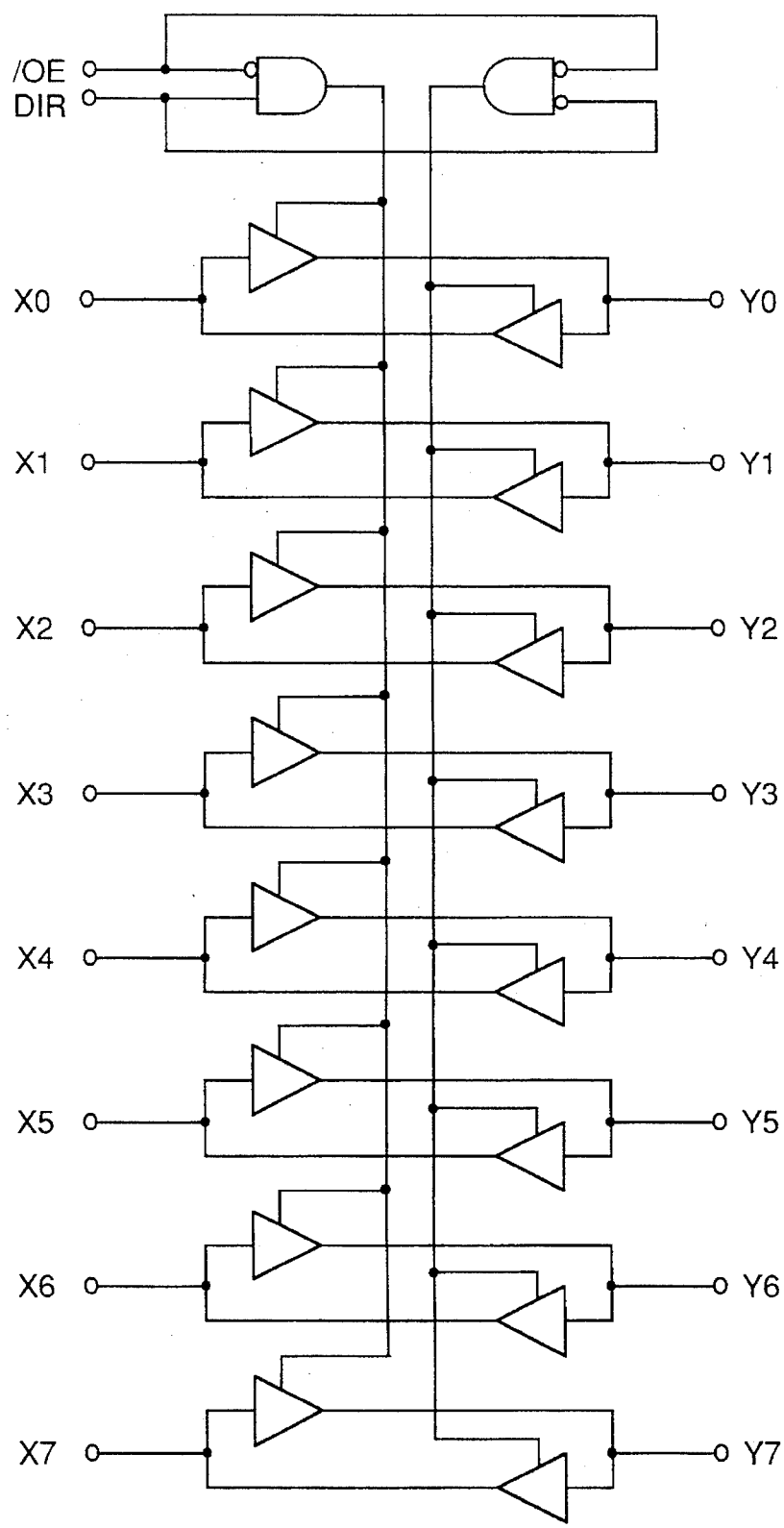

When a data fetch by the registers 24 and 25 is completed, the transmission demand interpret section 34 outputs a response information indicating the completion of transmission to the SBus control line 9 to release the CPU 4 from the waiting state for a response information. However, at this timing, the transmission operation is not completed and, therefore, it is continued. Next, the control line 29 of the data path switching means 18 is set at a value as indicated by line (m) of FIG. 5 or 6. Thus, the data path switching means 18 forms a data path as indicated by FIG. 4(b)–(m). At the same time, the control line 31 is controlled so as to output data of the register 24. As shown in FIG. 7(b), the data output to the 8-bit data bus 14 is transmitted, through the data path formed by the data path switching means 18, to the 8-bit data bus 16 and, when the 8-bit data bus 16 becomes stable, the control line of the peripheral device 21 is controlled so that 8-bit data is written into the peripheral device 21. When the data fetch is completed, the control line 29 of the data path switching means is set at a logic value as indicated by line (q) of FIG. 5 or 6. At the same time, the control line 31 is controlled so as to output data of the 8-bit I/O register 25. As shown in FIG. 7(c), the data output to the 8-bit data bus 15 is transmitted to the 8-bit data bus 16 through a data path as indicated by FIG. 4(b)–(q). When the 8-bit data bus 16 becomes stable, the control line of the peripheral device 21 is controlled so that the 810 bit data is written into the peripheral device 21. Thus, the 16-bit data is transmitted every 8-bit data divided into two. If no next transmission demand exists, the transmission demand interpret section 34 makes data output from the peripheral device 22 to the 8-bit data bus 17 end in order to cut off the connection therebetween and sets the control line of the data path switching means 29 at a logic value as indicated by line (w) of FIG. 5 or 6 to bring the graphics board into a waiting state.

The data processing apparatus according to the preferred embodiment of the present invention has the following merits when compared with the conventional data processing apparatus as shown in FIG. 8.

At first, the maximum number Nmax of devices connectable to the data bus is compared. In the conventional data processing apparatus, Nmax is a number of devices connected to the 8-bit data bus 68 and, accordingly, seven. In comparison with this, Nmax is a number of devices connected to the 8-bit data bus 15 and, accordingly, six in the present preferred embodiment.

In order to add 8-bit peripheral devices to the apparatus, Nmax increases by one every when one 8-bit peripheral device is added to in the conventional system. In the present preferred embodiment, Nmax is kept unchanged when two further 8-bit peripheral devices are added to, if they are connected to the 8-bit data buses 14 and 17, respectively, and it is increased by one every when one to four peripheral devices are added to further.

The maximum number Nmax is represented by the following equations assuming that p, h and q indicate numbers of 8-bit, 16-bit and 32-bit peripheral devices, respectively. In the conventional apparatus, Nmax=p+h+2 and =[P/4]+q+4 in the present preferred embodiment wherein the symbol [×] indicates a minimum integer not smaller than x.

As is apparent from the above-noted discussion, in the present preferred embodiment of the present invention, an increase of Nmax due to an increase of 8-bit peripheral devices is smaller than that in the conventional apparatus and, accordingly, an electric load of each data bus driver is reduced in the present invention.

Next, the machine cycle number, when the CPU transmitts 16-bit or 32-bit data to an 8-bit peripheral device, is considered. In the conventional data processing device, it is necessary to divide data units larger than 8 bits by the CPU upon transmitting the same and data transmission must be repeated by a division number of the data. For instance, two 8-bit data transmission for a 16-bit data unit and four 8-bit data transmission for a 32-bit data unit must be done by the CPU.

Contrary to this, in the preferred embodiment of the present invention, any data unit having a data width not exceeding 32 bits can be transmitted to 8-bit registers 24 to 27 at one time without dividing the data and data transmission from the registers 24 to 27 to a target 8-bit peripheral device is carried out by the transmission control means 28 and, accordingly, the data transmission in which the CPU engages is only one time resulting in a reduced machine cycle.

As stated above, the data processing apparatus of FIG. 1 comprises a first 32-bit data bus 8, four 8-bit I/O peripheral devices 19 to 22 which are connected one to one to first to fourth 8-bit data buses 14 to 17 consisting a first 8-bit data bus group formed by dividing said first 32-bit data bus into four from the upper most byte to the lower most byte, a second 32-bit data bus 7 which is divided into fifth to eighth 8-bit data buses 10 to 13 consisting a second 8-bit data bus group, a 32-bit I/O CPU 4 connected to said second 32-bit data bus, a data path switching circuit 18 connected between said first and second 32-bit data buses for forming a data path between two selected peripheral devices and the CPU and a transmission control means 28 for generating control signals in accordance with a transmission demand sent from the CPU 4 and for sending said control signals to at least one peripheral device engaging in a data transmission and said data path switching means 18 whereby said 8-bit peripheral devices can be connected to said 8-bit data buses of the first group in a dispersed manner while maintaining a data transmission function between two peripheral devices without engaging said CPU and, accordingly, it becomes possible to reduce the electric loads of data bus drivers.

Further, by connecting 8-bit registers 24 to 27 to said 8-bit data buses 14 to 17 of the first group, respectively, it becomes possible to transmit data having a data width larger than 8 bits but not exceeding 32 bits from the CPU 4 to one of the 8-bit I/O peripheral devices at one time and, accordingly, the machine cycle number of the CPU can be reduced.

Thus, the present invention can reduce the maximum electric load of each data bus driver since m-bit peripheral devices can be connected to m-bit data buses of the first group in a dispersed manner. Further, a data transmission between two m-bit peripheral devices connected to two of said m-bit data buses of the first group can be done by connecting said two m-bit data buses by the data path switching means.

Concretely, by a composition wherein two or more m-bit I/O peripheral devices are connected to each other via one or more m-bit data bus transceivers each of which connects two of m-bit data buses, an excellent data processing apparatus which can reduce electric loads of respective data bus drivers is provided.

Moreover, by connecting m-bit registers to m-bit data buses, respectively, the CPU can transmit data having a data width larger than m bits to one of m-bit I/O peripheral devices at one time without dividing the data and, accordingly, the machine cycle can be reduced.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A data processing apparatus comprising:

a first (k×m)-bit data bus for transmitting data of (k×m)-bits in parallel wherein k and m are an integer larger than one;

at least one (k×m)-bit I/O peripheral device connected to said first (k×m)-bit data bus;

a first m-bit data bus group consisting of first to k-th m-bit data buses obtained by dividing said first (k×m)-bit data bus into k data buses having an equal width of data bus;

a plurality of m-bit I/O peripheral devices each of which is connected to one m-bit data bus belonging to said first m-bit data bus group;

a second (k×m)-bit data bus;

a (k×m)-bit I/O central processing unit connected to said second (k×m)-bit data bus;

a second m-bit data bus group consisting of (k+1)-th to k-th m-bit data buses obtained by dividing said second (k×m)-bit data bus into k data buses having an equal width of data bus;

a transmission control means for generating control signals responsive to a demand of data transmission from said CPU; and a data path switching means connected between said first m-bit data bus group and second m-bit data bus group which forms a data transmission path between an arbitrary two of said plurality of m-bit I/O peripheral devices, said at least one (k×m)-bit I/O peripheral device and said CPU in response to a control signal output from said transmission control means.

2. A data processing apparatus comprising:

a first (k×m)-bit data bus for transmitting data of (k×m)-bits in parallel wherein k and m are an integer larger than one at least one (k×m)-bit I/O peripheral device connected to said first (k×m)-bit data bus;

a first m-bit data bus group consisting of first to k-th m-bit data buses obtained by dividing said first (k×m)-bit data bus into k data buses having an equal width of data bus;

a plurality of m-bit I/O data bus belonging to said first m-bit data bus group;

a second (k×m)-bit data bus;

a (k×m)-bit I/O central processing unit connected to said second (k×m)-bit data bus;

a data path switching means connected between said first and second m-bit data bus groups which comprises a first group of m-bit bus transceivers each connecting one m-bit data bus belonging to said first group and a corresponding m-bit data bus belonging to said second group and a second group m-bit bus transceivers each connecting two m-bit data buses belonging to said second group; and a transmission control means for generating control signals responsive to a data transmission demand from said CPU and for selectively controlling said m-bit bus transceivers belonging to said first and second transceiver groups and said m-bit I/O peripheral devices corresponding to the control signals, thereby forming at least one data transmission path between two arbitrary devices selected from among said m-bit I/O peripheral devices, at least one (k×m)-bit I/O peripheral device and said CPU.

3. The data processing apparatus as claimed in claim 1 wherein said data path switching means forms a (k×m)-bit data path between said first and second (k×m) bit data buses in response to a demand requesting data transmission therebetween.

4. The data processing apparatus as claimed in claim 1 wherein said plurality of m-bit peripheral devices include at least one m-bit register.

5. The data processing apparatus as claimed in claim 1 wherein said data path switching means comprises a first group consisted of a plurality of m-bit bus transceivers each connecting between two of said m-bit data buses consisting said first group, and a second group of m-bit bus transceivers each connecting one of said m-bit data buses consisting said first group and one of said m-bit data buses consisting said second group at an m-bit position corresponding to each other.

6. The data processing apparatus as claimed in claim 5 wherein m-bit registers are connected to respective m-bit data buses of said first group.

7. The data processing apparatus as claimed in claim 1 wherein said data path switching means comprises a (2k+1)-th m-bit data bus which is connected to said m-bit data buses of said first group via m-bit bus transceivers consisting a first group of transceivers, and m-bit bus transceivers consisting a second group of transceivers each of which connects one of said m-bit data buses of said first group with corresponding one of said m-bit data buses of said second group.

8. The data processing apparatus as claimed in claim 7, further comprises m-bit registers each connected to one of said m-bit data buses of said first group.

9. The data processing apparatus as claimed in claim 2, wherein said data path switching means forms an m-bit data path between two arbitrary devices selected from among said m-bit peripheral devices by enabling one m-bit bus transceiver belonging to said first transceiver group in response to a demand requesting data transmission therebetween.

10. The data processing apparatus as claimed in claim 2, wherein said data path switching means forms an m-bit data path between one of said plurality of m-bit data buses belonging to said first group and one of said plurality of m-bit data buses belonging to said second group by enabling one m-bit bus transceiver belonging to said second transceiver group in response to a demand requesting data transmission therebetween.

11. The data processing apparatus as claimed in claim 2, wherein said data path switching means forms a (k×m)-bit data path between said first and second (k×m) bit data bus groups by enabling all m-bit bus transceivers belonging to said second transceiver group in response to a demand requesting data transmission therebetween.

12. The data processing apparatus as claimed in claim 2, wherein said plurality of m-bit peripheral devices include at least one m-bit register.

13. The data processing apparatus as claimed in claim 2, further comprising one m-bit data bus disposed between said first transceiver group and second transceiver group in such a manner that any transceiver belonging to said first group is able to communicate with any transceiver belonging to said second group.

* * * * *